US008210748B2

(12) United States Patent
Hori

(10) Patent No.: US 8,210,748 B2
(45) Date of Patent: Jul. 3, 2012

(54) FLUID DYNAMIC BEARING DEVICE

(75) Inventor: Masaharu Hori, Kuwana (JP)

(73) Assignee: NTN Corporation, Osaka-shi (JP)

( * ) Notice: Subject to any disclaimer, the term of this patent is extended or adjusted under 35 U.S.C. 154(b) by 405 days.

(21) Appl. No.: 12/522,566

(22) PCT Filed: Aug. 9, 2007

(86) PCT No.: PCT/JP2007/065634
§ 371 (c)(1),
(2), (4) Date: Jul. 9, 2009

(87) PCT Pub. No.: WO2008/096465
PCT Pub. Date: Aug. 14, 2008

(65) Prior Publication Data
US 2010/0034494 A1     Feb. 11, 2010

(30) Foreign Application Priority Data

Feb. 5, 2007   (JP) ................................ 2007-025567

(51) Int. Cl.
*F16C 32/06*    (2006.01)
(52) U.S. Cl. ....................................... 384/119; 384/100
(58) Field of Classification Search .................. 384/100, 384/107–124, 130–132
See application file for complete search history.

(56) References Cited

U.S. PATENT DOCUMENTS

| | | | | |
|---|---|---|---|---|
| 5,357,163 A | * | 10/1994 | Minakuchi et al. | 310/90 |
| 5,806,987 A | * | 9/1998 | Nose et al. | 384/100 |
| 6,066,903 A | * | 5/2000 | Ichiyama | 310/90 |
| 6,246,136 B1 | * | 6/2001 | Ichiyama | 310/90 |
| 6,404,087 B1 | * | 6/2002 | Ichiyama | 310/90 |
| 6,799,891 B2 | * | 10/2004 | Kurobe et al. | 384/107 |
| 6,817,766 B2 | * | 11/2004 | Gomyo | 384/100 |
| 7,201,516 B2 | * | 4/2007 | Haga | 384/100 |
| 7,296,932 B2 | * | 11/2007 | Neumann et al. | 384/130 |

FOREIGN PATENT DOCUMENTS

| | | |
|---|---|---|
| JP | 2002-147440 A | 5/2002 |
| JP | 2004-176815 A | 6/2004 |
| JP | 2005-180622 A | 7/2005 |
| JP | 2006-177387 A | 7/2006 |
| JP | 2006-292013 A | 10/2006 |
| WO | 2006/109449 A1 | 10/2006 |

OTHER PUBLICATIONS

Machine translation of 2005-177387.*
Notification of Transmittal of Translation of the International Preliminary Report on Patentability (Form PCT/IB/338) of International Application No. PCT/JP2007/065634 mailed Aug. 20, 2009 with Forms PCT/IB/373 and PCT/ISA/237.
International Search Report of PCT/JP2007/065634, Mailing Date of Nov. 6, 2007.

* cited by examiner

*Primary Examiner* — Thomas R Hannon
(74) *Attorney, Agent, or Firm* — Westerman, Hattori, Daniels & Adrian, LLP

(57) ABSTRACT

Peeling-off of an oil-repellent film can be reliably prevented. A fluid dynamic bearing device (1) includes a shaft member (2) and first and second flange portions (9, 10) serving as seal portions fixed to the shaft member (2). On outer peripheral sides of the first and second flange portions (9, 10), a first seal space (S1) and a second seal space (S2) are formed, respectively. Oil-repellent films (11) are provided on end surfaces of the first flange portion (9) and the second flange portion (10) separately from a pressure-receiving surface (12) subjected to pressure at a time of assembly, the end surfaces being exposed to external air.

4 Claims, 7 Drawing Sheets

FLUID DYNAMIC BEARING DEVICE

TECHNICAL FIELD

The present invention relates to a fluid dynamic bearing device.

BACKGROUND ART

A fluid dynamic bearing device is a bearing device which rotatably supports a shaft member through an oil film formed in bearing gaps. The fluid dynamic bearing device has characteristics such as high-speed rotation operation, excellent rotational accuracy, and quietness. In recent years, by taking advantage of those characteristics, the fluid dynamic bearing device is suitably used as a bearing device for a motor to be mounted to various electrical apparatuses such as information equipment. Specifically, as a bearing device for a motor, the fluid dynamic bearing device may be suitably used in the following: a spindle motor for an information apparatus such as a magnetic disk drive such as an HDD, an optical disk drive for a CD-ROM, CD-R/RW, DVD-ROM/RAM, or the like, or a magneto-optical disk drive for an MD, MO, or the like; a polygon scanner motor of a laser beam printer (LBP); or a fan motor.

Of the above-mentioned motors, in particular, in the spindle motor for a disk drive, contamination due to oil (lubricating oil) can not be tolerated at all in terms of its product properties. Under the circumstances, in the fluid dynamic bearing device incorporated in the spindle motor, for the purpose of preventing leakage of lubricating oil filling the inside of the bearing, a seal portion is commonly provided to an opening portion of a bearing member (housing) so as to form a seal space in which the lubricating oil is retained with use of a capillary force. Further, in order to prevent the leakage of lubricating oil more reliably, on an end surface of the seal portion, which is exposed to external air, an oil-repellent film containing a fluorine resin or the like is provided in some cases (refer to Patent Documents 1 and 2, for example).

Patent Document 1: JP 2004-176815 A
Patent Document 2: JP 2006-292013 A

SUMMARY OF THE INVENTION

As disclosed in Patent Documents described above, the end surface of the seal portion, which is exposed to external air and on which the oil-repellent film is formed, is formed as a flat and smooth surface in many cases. Further, an oil-repellent agent generally has excellent wettability, and hence the oil-repellent film is formed over the entire of the end surface of the seal portion in many cases. In addition, in consideration of the operability at the time of application of an oil-repellent agent, the oil-repellent film is commonly formed at a stage where components are separated from each other prior to the assembly of members. However, generally, the end surface of the seal portion, which is exposed to external air, constitutes a pressure-receiving surface subjected to pressure at the time of assembly. Thus, when the oil-repellent film is formed in advance over the entire of the end surface of the seal portion as described above, there is a risk that the oil-repellent film comes into contact with assembly jigs and the like at the time of assembly so as to suffer peeling-off, breakage, and the like. Peeling-off of the oil-repellent film naturally leads to deterioration in oil-repellent effect, to a risk of a decrease in fastening force (bonding force) between a seal member and other members, and in addition, to a risk of causing contamination.

The present invention has been made to solve the above-mentioned problems. It is therefore an object of the present invention to provide a fluid dynamic bearing device capable of maintaining excellent bearing performance while preventing the oil-repellent film from being peeled off.

In order to achieve the above-mentioned object, according to the present invention, provided is a fluid dynamic bearing device, comprising:

a radial bearing portion for supporting in a radial direction a shaft to be supported with an oil film formed in a radial bearing gap;

a seal space opened to external air; and a seal portion forming the seal space, wherein an oil-repellent film is formed on an end surface of the seal portion separately from a pressure-receiving surface subjected to pressure at a time of assembly, the end surface being exposed to the external air. Note that, the seal portion in the present invention represents members and portions forming the seal space, and conceptually includes not only the case of being provided separately from other members (shaft members and bearing members), but also the case of being provided integrally with the other members.

As described above, the present invention is featured in that the oil-repellent film is formed on the end surface of the seal portion separately from the pressure-receiving surface subjected to the pressure at the time of assembly, the end surface being exposed to the external air. With this structure, even when the oil-repellent film is formed in advance on the end surface of the seal portion, the seal portion can be pressurized with the above-mentioned pressure-receiving surface at the time of assembly of a bearing device. Therefore, it is possible to prevent a decrease in fastening strength (bonding strength) between a seal member and other members and generation of contamination, which are caused by peeling-off or the like of the oil-repellent film at the time of assembly of the bearing device. Meanwhile, the oil-repellent film is not subjected to peeling-off or the like and exists on the end surface of the seal portion in a predetermined mode. As a result, it is possible to reliably prevent contamination of ambient environment, which is caused by leakage of lubricating oil, and deterioration in performance of a motor owing to this.

In the above-mentioned structure, the oil-repellent film and the pressure-receiving surface may be formed at different axial positions. With this structure, it is sufficient that the end surface of the assembly jig used at the time of assembly of the fluid dynamic bearing device is formed as a flat surface. Accordingly, it becomes unnecessary to have many assembly jigs conformed to the shapes of the end surfaces of the seal portions, whereby it is possible to achieve manufacturing cost reduction of the fluid dynamic bearing device.

As described above, according to the present invention, it is possible to prevent the oil-repellent film from being peeled off, and possible to reliably prevent deterioration in oil-repellent effect in accordance with peeling-off of the oil-repellent film, and in addition, prevent occurrence of various failures such as generation of contamination. With this, it is possible to provide a fluid dynamic bearing device capable of maintaining excellent bearing performance while reliably preventing oil leakage.

DETAILED DESCRIPTION OF THE INVENTION

In the following, embodiments of the present invention are described with reference to the drawings.

Figure 1:
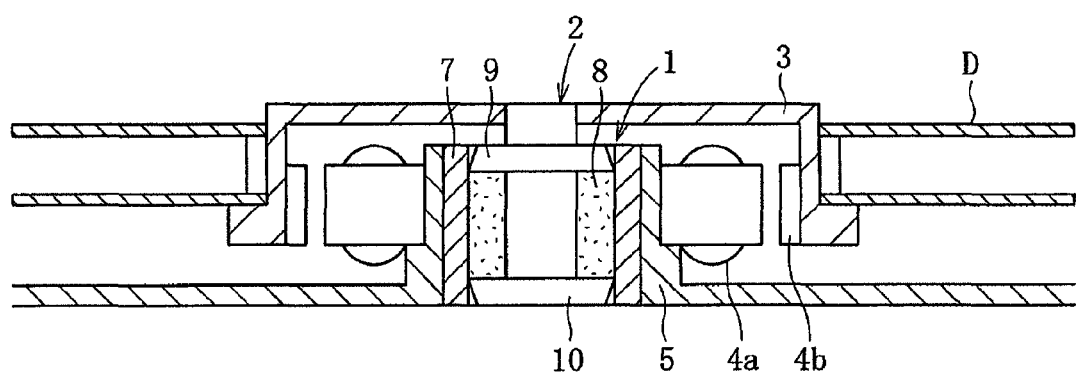
FIG. 1 is a sectional view of an example of a spindle motor incorporating a fluid dynamic bearing device.

FIG. 1 conceptually illustrates an example of the structure of a spindle motor for an information apparatus into which there is incorporated a fluid dynamic bearing device according to an embodiment of the present invention. This spindle motor for an information apparatus is used in a disk drive such as an HDD, and includes a fluid dynamic bearing device 1, a disk hub 3 attached to a shaft member 2 of the fluid dynamic bearing device 1, a stator coil 4a and a rotor magnet 4b that are opposed to each other with, for example, a radial gap therebetween, and a bracket 5 fixing a bearing member 6 of the fluid dynamic bearing device 1 at its inner periphery. The stator coil 4a is mounted to an outer periphery of the bracket 5, and the rotor magnet 4b is mounted to an inner periphery of the disk hub 3. The disk hub 3 holds one or a plurality of disks D such as magnetic disks. When the stator coil 4a is energized, the rotor magnet 4b rotates due to an electromagnetic force generated between the stator coil 4a and the rotor magnet 4b, and thus, the disk hub 3 and the disk D held by the disk hub 3 rotate integrally with the shaft member 2.

Figure 2:
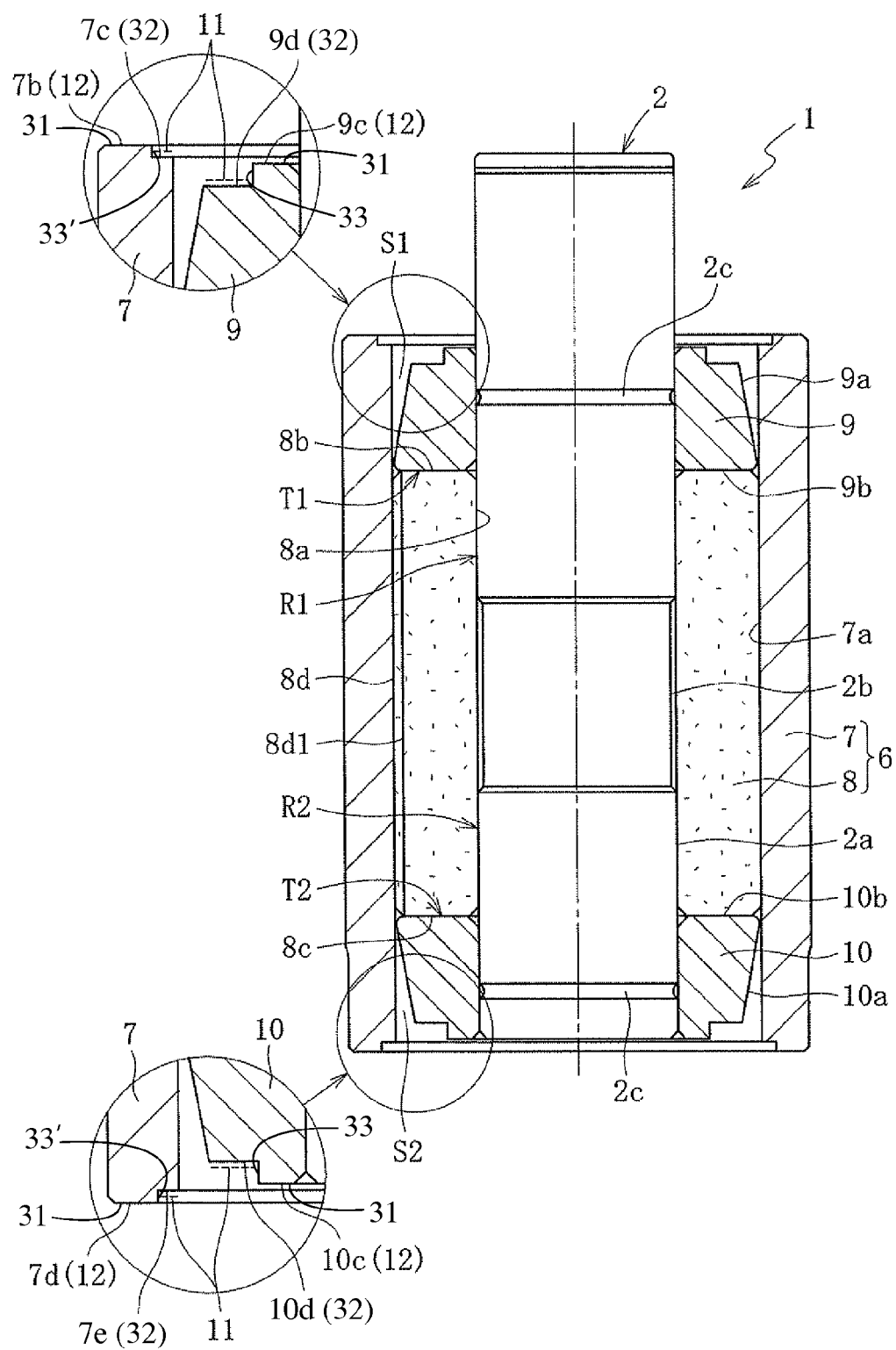
FIG. 2 is a sectional view of a fluid dynamic bearing device according to a first embodiment of the present invention.

FIG. 2 illustrates the fluid dynamic bearing device 1 of FIG. 1 in an enlarged manner, for illustrating the fluid dynamic bearing device according to a first embodiment of the present invention. The fluid dynamic bearing device 1 includes, as main components, the shaft member 2, the first flange portion 9 and the second flange portion 10 fixed to the shaft member 2 and serving as seal portions, and the bearing member 6 having an inner periphery along which the shaft member 2 is inserted. In this embodiment, the bearing member 6 is constituted by a housing 7 and a bearing sleeve 8 fixed to an inner periphery of the housing 7. Note that, for the sake of convenience in the following description, the side on which the shaft member 2 protrudes from the opening portion of the housing 7 is defined as an upper side and the side axially opposite thereto is defined as a lower side.

The shaft member 2 is made of metal material such as stainless steel. The shaft member 2 is formed as a shaft substantially uniform in diameter as a whole, and has a middle portion in which a thin portion 2b of diameter slightly smaller than those of other portions is formed. On an outer peripheral surface 2a of the shaft member 2, at fixation positions of the first flange portion 9 and the second flange portion 10, there is formed a recessed portion, for example, a circumferential groove 2c.

The bearing sleeve 8 is formed, for example, of a porous body made of sintered metal, in particular, a porous body made of sintered metal including copper as a main component, and is formed into a cylindrical shape. The bearing sleeve 8 is fixed to a predetermined position on the housing 7 by an appropriate means such as bonding, press-fitting, or press-fit bonding. Note that, the bearing sleeve 8 may be formed of an elastic metal material such as brass or porous bodies made of materials other than the sintered metal (porous resin, for example).

Figure 3A:
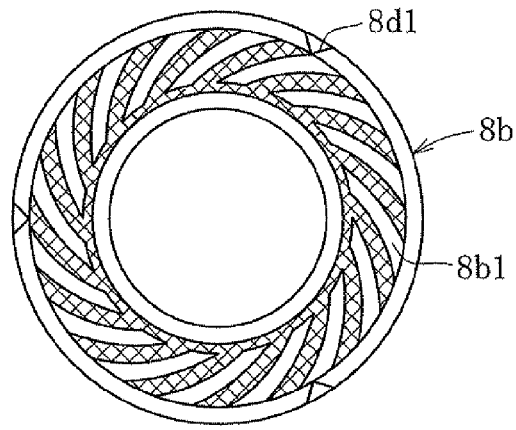
FIG. 3A is a top view of a bearing sleeve.
Figure 3B:
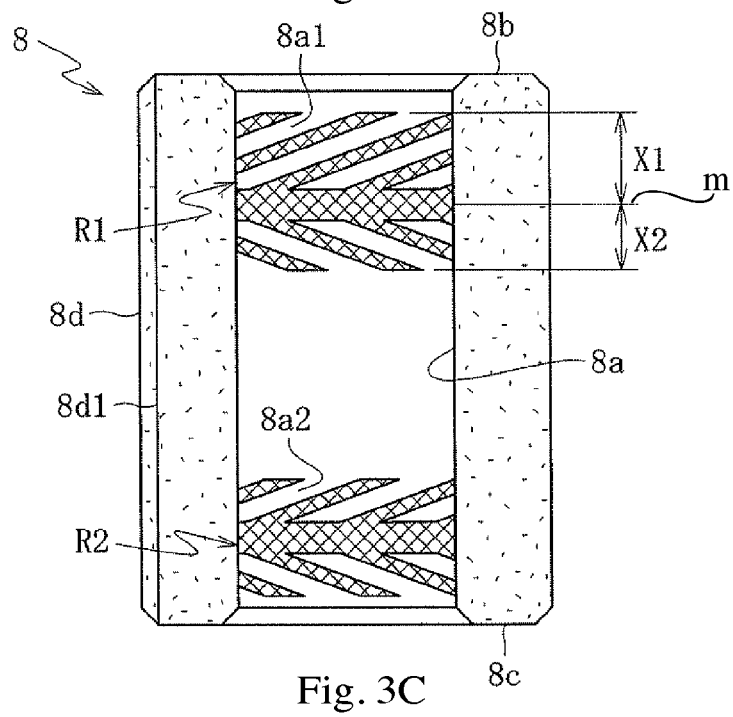
FIG. 3B is a sectional view of the bearing sleeve.

On an inner peripheral surface 8a of the bearing sleeve 8, cylindrical regions constituting radial bearing surfaces of a first radial bearing portion R1 and a second radial bearing portion R2 are provided at two portions separated from each other in the axial direction. In the cylindrical regions, for example, multiple dynamic pressure grooves 8a1 and 8a2 arranged in a herringbone pattern as illustrated in FIG. 3B are respectively formed as radial dynamic pressure generating portions. The dynamic pressure grooves 8a1 on the upper side are formed asymmetrically with respect to an axial center m (axial center between the upper and lower inclined-groove regions), and an axial dimension X1 of the upper region with respect to the axial center m is larger than an axial dimension X2 of the lower region with respect thereto. Note that, the dynamic pressure grooves may be formed in the outer peripheral surface 2a of the shaft member 2, and may be provided in other well-known patterns such as a spiral pattern. On an outer peripheral surface 8d of the bearing sleeve 8, there are formed one or multiple axial grooves 8d1 for communicating both end surfaces 8b and 8c with each other. In this embodiment, three axial grooves 8d1 are equiangularly arranged in a circumferential direction.

On an upper end surface 8b of the bearing sleeve 8, there is provided an annular region constituting a thrust bearing surface of a first thrust bearing portion T1. In the region, for example, multiple dynamic pressure grooves 8b1 arranged in a spiral pattern as illustrated in FIG. 3A are formed as a thrust dynamic pressure generating portion. The dynamic pressure grooves 8b1 may be formed in a lower end surface 9b of the first flange portion 9, and may be provided in other well-known patterns such as a herringbone pattern.

Figure 3C:
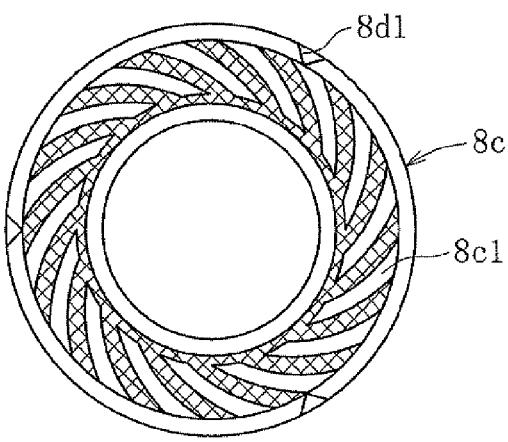
FIG. 3C is a bottom view of the bearing sleeve.

On a lower end surface 8c of the bearing sleeve 8, there is provided an annular region constituting a thrust bearing surface of a second thrust bearing portion T2. In the region, for example, multiple dynamic pressure grooves 8c1 arranged in a spiral pattern as illustrated in FIG. 3C are formed as a thrust dynamic pressure generating portion. The dynamic pressure grooves 8c1 may be formed in an upper end surface 10b of the second flange portion 10, and may be provided in other well-known patterns such as a herringbone pattern.

The housing 7 is, for example, formed of a soft metal such as an aluminum alloy or brass in a substantially cylindrical shape with both sides opened. An inner peripheral surface 7a of the housing 7 is formed in a straight cylindrical surface. The housing 7 is fixed to the inner peripheral surface of the bracket 5 illustrated in FIG. 1 by appropriate means such as press-fitting, bonding, press-fit bonding, or welding.

The housing 7 may be made, for example, by using a resin in addition to a metal material described above. In this case, the housing 7 may be formed by injection molding using a resin composition whose base resin is a crystalline resin, such as liquid crystal polymer (LCP), polyphenylene sulfide (PPS), or polyetheretherketone (PEEK), or an amorphous resin, such as polysulfone (PSU), polyethersulfone (PES), or polyphenylsulfone (PPSU). These are obviously just examples, and other base resin can be used in consideration of usage environment and the like. The type of filler to be filled to the base resin described above is also not limited in particular, and therefore, for example, fiber filler such as glass fiber, whisker filler such as potassium titanate, scale-like filler such as mica, fiber or powder conductive filler such as carbon fiber, carbon black, black lead, carbon nano material, and metal powder can be used as fillers. Such fillers can be used alone or can be used by mixing two or more types.

Each of the first flange portion 9 and the second flange portion 10 serving as seal portions is formed of an elastic metal material such as brass, other metal materials, or a resin material, and is formed in a ring-like shape so as to be fixed to the outer peripheral surface 2a of the shaft member 2 on both the end sides of the bearing sleeve 8, for example, by bonding. At the time of fixation by bonding, adhesive applied to the shaft member 2 fills the circumferential groove 2c serving as an adhesive pool and is cured therein, to thereby increase bonding strength of both the flange portions 9 and 10 with respect to the shaft member 2.

A first seal space S1 of predetermined volume is formed between an outer peripheral surface 9a of the first flange portion 9 and the inner peripheral surface 7a of the housing 7. Further, a second seal space S2 of predetermined volume is formed between an outer peripheral surface 10a of the second flange portion 10 and the inner peripheral surface 7a corresponding to the lower end opening portion of the housing 7. In this embodiment, the outer peripheral surface 9a of the first flange portion 9 and the outer peripheral surface 10a of the second flange portion 10 are formed into shapes of tapered surfaces gradually decreased in diameter to the outer side of the bearing device, respectively. Therefore, both the seal spaces S1 and S2 exhibit shapes of tapered surfaces gradually decreased in diameter in the direction approaching each other (direction to the inside of bearing member 6).

On the end surface of the first flange portion 9 serving as a seal portion, which is exposed to external air, a step portion 33 in an axial direction is formed. By this step portion 33, the end surface is defined into a first upper end surface 9c and a second upper end surface 9d retracted downward with respect to the first upper end surface 9c by a predetermined amount (arranged closer to an inside bearing side than the first upper end surface 9c). From the above, the first upper end surface 9c corresponds to the "first end surface 31" of the present invention, and the second upper end surface 9d corresponds to the "second end surface 32" of the present invention. Further, on the second upper end surface 9d (second end surface 32), there is formed an oil-repellent film 11 made of an oil-repellent agent. As described later, in this case, the first upper end surface 9c (first end surface 31) constitutes a pressure-receiving surface 12 subjected to pressure at the time of being assembled to the shaft member 2. Accordingly, the oil-repellent film 11 is provided while being separated from the pressure-receiving surface 12 in the axial direction.

Similarly, on the end surface of the second flange portion 10 serving as a seal portion, which is exposed to external air, a step portion 33 in an axial direction is formed. By this step portion 33, the end surface is defined into a first lower end surface 10c and a second lower end surface 10d retracted upward with respect to the first lower end surface 10c by a predetermined amount arranged closer to an inside bearing side than the first lower end surface 10C). From the above, the first lower end surface 10c corresponds to the "first end surface 31" of the present invention, and the second lower end surface 10d corresponds to the "second end surface 32" of the present invention. Further, on the second lower end surface 10d (second end surface 32), there is formed an oil-repellent film 11 made of an oil-repellent agent. As described later, in this case, the first lower end surface 10c (first end surface 31) constitutes the pressure-receiving surface 12 subjected to pressure at the time of being assembled to the shaft member 2. Accordingly, the oil-repellent film 11 is provided while being separated from the pressure-receiving surface 12 in the axial direction.

Further, in this embodiment, the following parts of the housing 7 function as seal portions: a part including the inner peripheral surface 7a on the upper end side, which forms the first seal space S1, and a part including the inner peripheral surface 7a on the lower end side, which forms the second seal space S2. On the upper end surface of the housing 7, which is exposed to external air, there are formed a first upper end surface 7b and a second upper end surface 7c retracted downward with respect to the first upper end surface 7b by a predetermined amount. On the second upper end surface 7c, there is formed an oil-repellent film 11 made of an oil-repellent agent. Further, on the lower end surface of the housing 7, which is exposed to external air, there are formed a first lower end surface 7d and a second lower end surface 7e retracted upward with respect to the first lower end surface 7d by a predetermined amount. On the second lower end surface 7e, there is formed an oil-repellent film 11 made of an oil-repellent agent. In this case, the first upper end surface 7b and the first lower end surface 7d constitute the pressure-receiving surface 12 subjected to pressure at the time of being assembled. From the above, the first upper end surface 7b and the first lower end surface 7d of the housing 7 corresponds to the "first end surface 31" of the present invention, and the second upper end surface 7c and the second lower end surface 7e of the housing 7 corresponds to the "second end surface 32" of the present invention. Step 33 is formed on the ends of housing 7.

Each of the above-mentioned oil-repellent films 11 is formed at a stage where components are separated from each other prior to the assembly of the fluid dynamic bearing device 1. Note that, the oil-repellent agent composing the oil-repellent films 11 contains as a main component, for example, a resin material having oil repellency, and is produced by dissolving the resin material in an organic solvent. Examples of the available resin material having oil repellency include a fluorine resin, specifically, PTFE (polytetrafluoroethylene), PFA (tetrafluoroethylene-perfluoroalkyl vinyl ether copolymer), FEP (tetrafluoroethylene-hexafluoropropylene copolymer), ETFE (tetrafluoroethylene-ethylene copolymer), PVDF (polyvinylidene-fluoride), or PCTFE (polychlorotrifluoroethylene).

Figure 4:
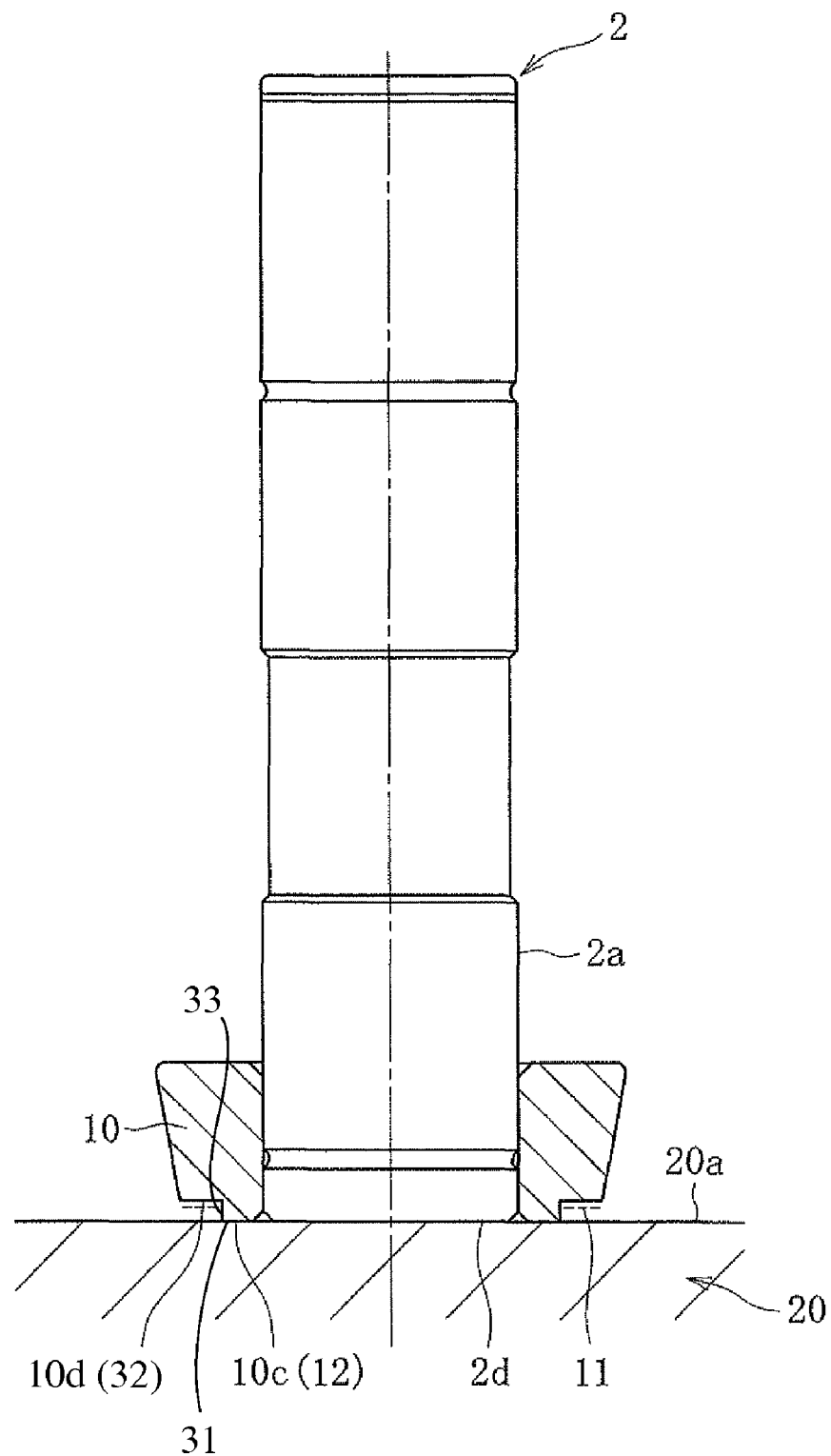
FIG. 4 is a conceptual sectional view of a part of an assembly step of a fluid dynamic bearing device illustrated in FIG. 2.

The fluid dynamic bearing device 1 constituted by the above-mentioned components can be made, for example, by the following procedure. First, as illustrated in FIG. 4, the second flange portion 10 is placed on a flat and smooth surface (upper end surface) 20a of an assembly jig 20, and for example, the shaft member 2 in which adhesive is applied to a predetermined region on the outer peripheral surface 2a is press-fitted along the inner periphery of the second flange portion 10. Next, after the bearing sleeve 8 is fitted onto the shaft member 2, the first flange portion 9 is press-fitted to the outer periphery of the shaft member 2, and then the first flange portion 9 is slid up to the position at which both thrust bearing gap widths of the first thrust bearing portion T1 and the second thrust bearing portion T2 can be secured between the lower end surface 9 b thereof and the upper end surface 8b of the bearing sleeve 8. After that, the adhesive is cured so as to fix both the flange portions 9 and 10 by bonding with respect to the shaft member 2. The housing 7 is arranged along an outer periphery of the shaft member 2, the bearing sleeve 8, and the first flange portion 9 and the second flange portion 10 integrated with each other in this manner, whereby the bearing sleeve 8 and the housing 7 are fixed by bonding to each other.

After the assembly of the fluid dynamic bearing device 1 is completed, lubricating oil is filled to the internal space of the housing 7 sealed with the both flange portions 9 and 10 including an internal air hole of the bearing sleeve 8. Note that, the lubricating oil can be filled, for example, by immersing the fluid dynamic bearing device in a state not filled with the lubricating oil and then being opened to atmospheric pressure.

In the fluid dynamic bearing device 1 structured as described above, when the shaft member 2 is rotated, the regions constituting the radial bearing surfaces formed separately from each other in the two upper and lower regions of the bearing sleeve 8 are opposed to the outer peripheral surface 2a of the shaft member 2 through an intermediation of radial bearing gaps. In accordance with the rotation of the shaft member 2, oil films formed in both the radial bearing gaps are increased in the oil film rigidity by the dynamic pressure effect of the dynamic pressure grooves 8a1 and 8a2 respectively formed in both the radial bearing surfaces. As a result, the shaft member 2 is rotatably supported in a radial direction in a non-contact manner. With this, the first radial bearing portion R1 and the second radial bearing portion R2 for rotatably supporting the shaft member 2 in the radial direction in a non-contact manner are formed separately from each other in the axial direction.

Further, when the shaft member 2 is rotated, the region constituting the thrust bearing surface of the upper end surface 8b of the bearing sleeve 8 is opposed to the lower end surface 9b of the first flange portion 9 through an intermediation of a predetermined thrust bearing gap. Further, the region constituting the thrust bearing surface of the lower end surface 8c of the bearing sleeve 8 is opposed to the upper end surface 10b of the second flange portion 10 through an intermediation of a predetermined thrust bearing gap. In accordance with the rotation of the shaft member 2, oil films formed in the thrust bearing gaps are increased in the oil film rigidity by the dynamic pressure effect of the dynamic pressure grooves 8b1 and 8b2 respectively formed in the thrust bearing surfaces. As a result, the shaft member 2 is rotatably supported in both thrust directions in a non-contact manner. With this, the first thrust bearing portion T1 and the second thrust bearing portion T2 for supporting the shaft member 2 in both the thrust directions in a non-contact manner are formed.

Further, fluid paths constituted by the axial grooves 8d1 of the bearing sleeve 8 and the bearing gaps (radial bearing gaps of first radial bearing portion R1 and second radial bearing portion R2 and thrust bearing gaps of first thrust bearing portion T1 and second thrust bearing portion T2) constitute a series of circulation paths in the inside of the housing 7. Further, the lubricating oil filling the inner space of the housing 7 circulates in a fluidized manner through the circulation paths. With this, it is possible to prevent, while maintaining pressure balance in the lubricating oil, generation of air bubbles involved in local generation of a negative pressure, leakage of the lubricating oil and occurrence of vibration due to the generation of air bubbles. Further, both the ends of the fluid paths constituted by the axial grooves 8d1 of the bearing sleeve 8 are communicated with the first seal space S1 and the second seal space S2 which are opened to external air, respectively. Therefore, even when air bubbles are mixed in the lubricating oil for some reason, the air bubbles are discharged to external air when the air bubbles circulate with the lubricating oil, and hence an adverse effect due to the air bubbles is more effectively prevented.

Note that, while not shown, the axial fluid paths formed between the bearing sleeve 8 and the housing 7 may be formed by providing the axial grooves of the inner peripheral surface 7a of the housing 7.

Further, when the shaft member 2 is rotated, as described above, the seal space S1 and S2 formed between the inner peripheral surface 7a of the housing 7 and the outer peripheral surface 9a and 10a of the first flange portion 9 and the second flange portion 10 exhibit shapes of tapered surfaces gradually downsized to the inside of the housing 7. By a drawing-in effect due to a capillary force and by a drawing-in effect due to a centrifugal force at the time of rotation, the lubricating oil in both the seal spaces S1 and S2 is drawn in a direction in which the seal space S1 and S2 become smaller, that is, to the inside of the housing 7. With this, it is possible to effectively prevent leakage of the lubricating oil from the inside of the housing 7. Further, the seal space S1 and S2 have a buffering function for absorbing an amount of change in volume in accordance with change in temperature of the lubricating oil filling the inner space of the housing 7, and the oil surfaces of the lubricating oil are constantly maintained in the seal space S1 and S2 within an expected range of change in temperature.

As described above, in the present invention, on both the flange portions 9 and 10 serving as seal portions and the end surfaces on the upper and lower end portions of the housing 7, which are exposed to external air, there are formed the oil-repellent films 11 separately from the respective pressure-receiving surfaces 12 (first upper end surface 9c, first lower end surface 10c, and first upper end surface 7b and first lower end surface 7d) subjected to the pressure at the time of assembly. Therefore, the assembly of the fluid dynamic bearing device 1 may be performed by pressurizing the respective pressure-receiving surfaces 12, and as described above, even when the oil-repellent films 11 are formed at the stage where components are separated from each other, the oil-repellent films 11 are not peeled off partially or wholly along with the assembly thereof. Accordingly, it is possible to reliably obtain an oil-repellent effect by providing the oil-repellent films 11, and possible to reliably prevent leakage of the lubricating oil from both the seal spaces S1 and S2. Further, with the above-mentioned structure, it is possible to effectively prevent failures such as deterioration in bonding strength of the flange portions 9 and 10 with respect to the shaft member 2, deterioration in bonding strength between the housing 7 and the bearing sleeve 8, which are caused by the oil-repellent films 11 of both the flange portions 9 and 10 and of the housing 7 peeled off in accordance with the assembly, and contamination caused by the peeled oil-repellent films 11 which invade inside the bearing. As a result, excellent bearing performance can be maintained.

In addition, in each of the seal portions, the oil-repellent film 11 and the pressure-receiving surface 12 are provided at different axial positions, and hence it is sufficient that an upper end surface 20a serving as a supporting surface of the assembly jig 20 is formed as a flat surface. Accordingly, it is unnecessary to have the assembly jig 20 conformed to the shapes of the end surface of each of the seal portions, whereby it is possible to achieve manufacturing cost reduction of the fluid dynamic bearing device 1.

Figure 5A:
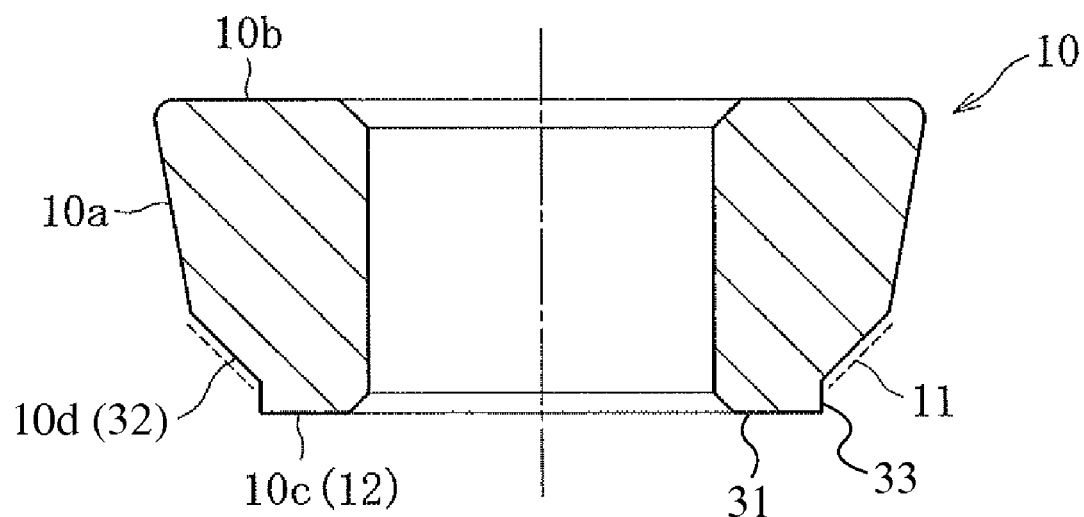
FIG. 5A is a sectional view of a second flange portion according to another mode.
Figure 5B:
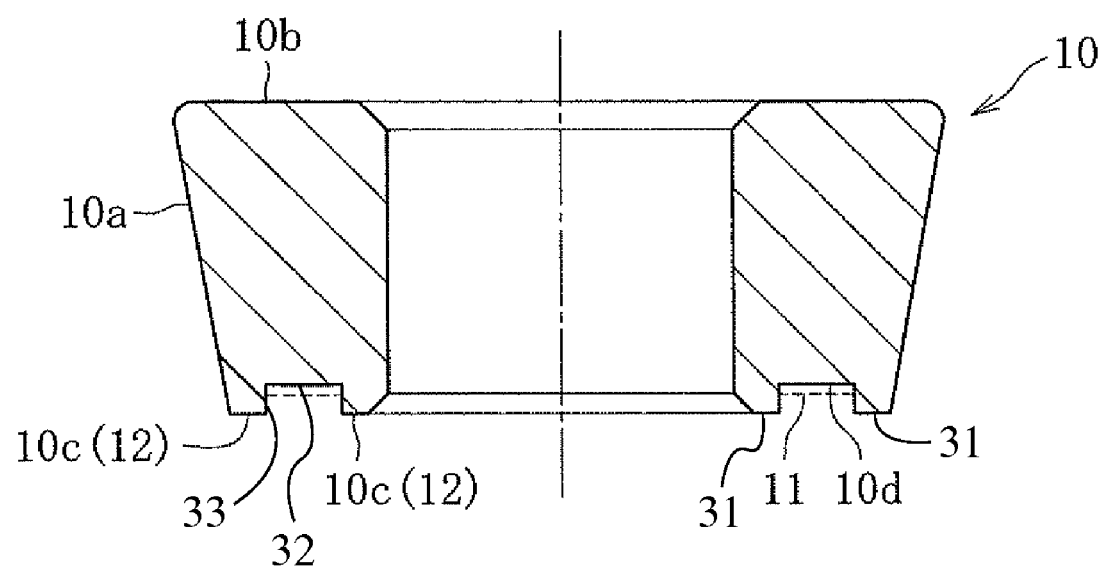
FIG. 5B is a sectional view of the second flange portion according to another mode.

Note that, when the oil-repellent films 11 can be prevented from being peeled off by being subjected to pressure at the time of assembly, the above-mentioned operational effect can be reliably obtained. Thus, as illustrated in FIG. 5A, for example, it is possible form a tapered surface on the end surface of the seal portion, which is exposed to external air, and to form the oil-repellent film 11 on the tapered surface. Alternatively, as illustrated in FIG. 5B, for example, it is also possible to form a recessed portion on the end surface of the seal portion, which is exposed to external air, and to form the oil-repellent film 11 in the recessed portion. Note that, FIGS. 5A and 5B illustrate a case of applying the structures to the second flange portion 10, and as a matter of course, the similar structures can be adopted to the first flange portion 9 and the housing 7.

Further, hereinbefore, while there has been described a case where the oil-repellent films 11 are formed on both the first flange portion 9 and the second flange portion 10 serving as seal portions and the housing 7 (bearing member 6), the oil-repellent films 11 may be formed only on the first flange portion 9 and the second flange portion 10 or the housing 7.

Hereinbefore, while an embodiment of the present invention is described, the present invention is not limited to this embodiment, and is suitably applicable to a fluid dynamic bearing device structured as follows.

Figure 6:
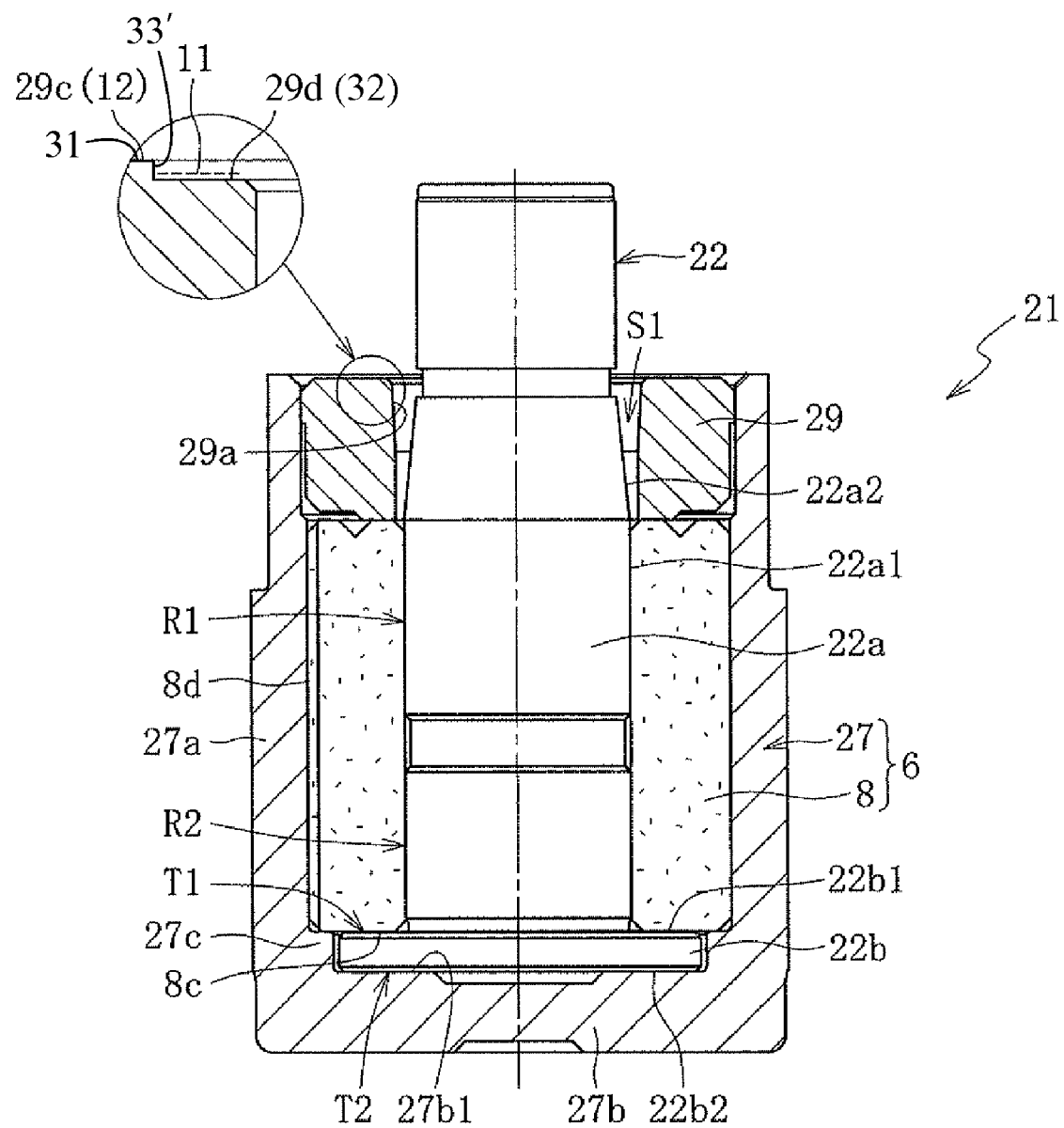
FIG. 6 is a sectional view of a fluid dynamic bearing device according to a second embodiment of the present invention.

FIG. 6 illustrates a fluid dynamic bearing device according to a second embodiment of the present invention. A fluid dynamic bearing device 21 illustrated in the figure is different from the fluid dynamic bearing device 1 illustrated in FIG. 2 mainly in that a housing 27 is formed in a bottomed cylindrical shape in which a side portion 27a and a bottom portion 27b are integrated with each other, that a seal member 29 serving as a seal portion is fixed to the inner periphery of the upper end opening portion of the housing 27 (side portion 27a) so that the seal space S1 is formed on the inner peripheral side of the seal member 29, and that the first thrust bearing portion T1 and the second thrust bearing portion T2 are respectively formed on both end sides of a flange portion 22b constituting a shaft member 22.

In the fluid dynamic bearing device 21 structured as described above, on the end surface (surface) of the seal member 29, which is exposed to external air, there are formed a first upper end surface 29c (first end surface 31) and a second upper end surface 29d (second end surface 32) retracted downward with respect to the first upper end surface 29c (first end surface 31) by a predetermined amount. The oil-repellent film 11 is formed on the second upper end surface 29d second end surface 32) separated from the first upper end surface 29c (first end surface 31) serving as the pressure-receiving surface 12. By adopting the structure, it is possible to obtain the operational effects similar to those described in the first embodiment. As a matter of course, similarly to the structure illustrated in FIG. 5, it is also possible to form a tapered surface or a recessed portion on/in the end surface of the seal member 29, which is exposed to external air, and to form the oil-repellent film 11 on the tapered surface or in the recessed portion. Note that, other components are the same as those in the embodiment illustrated in FIG. 2, and hence are denoted by the same reference symbols so as to omit description thereof.

Figure 7:
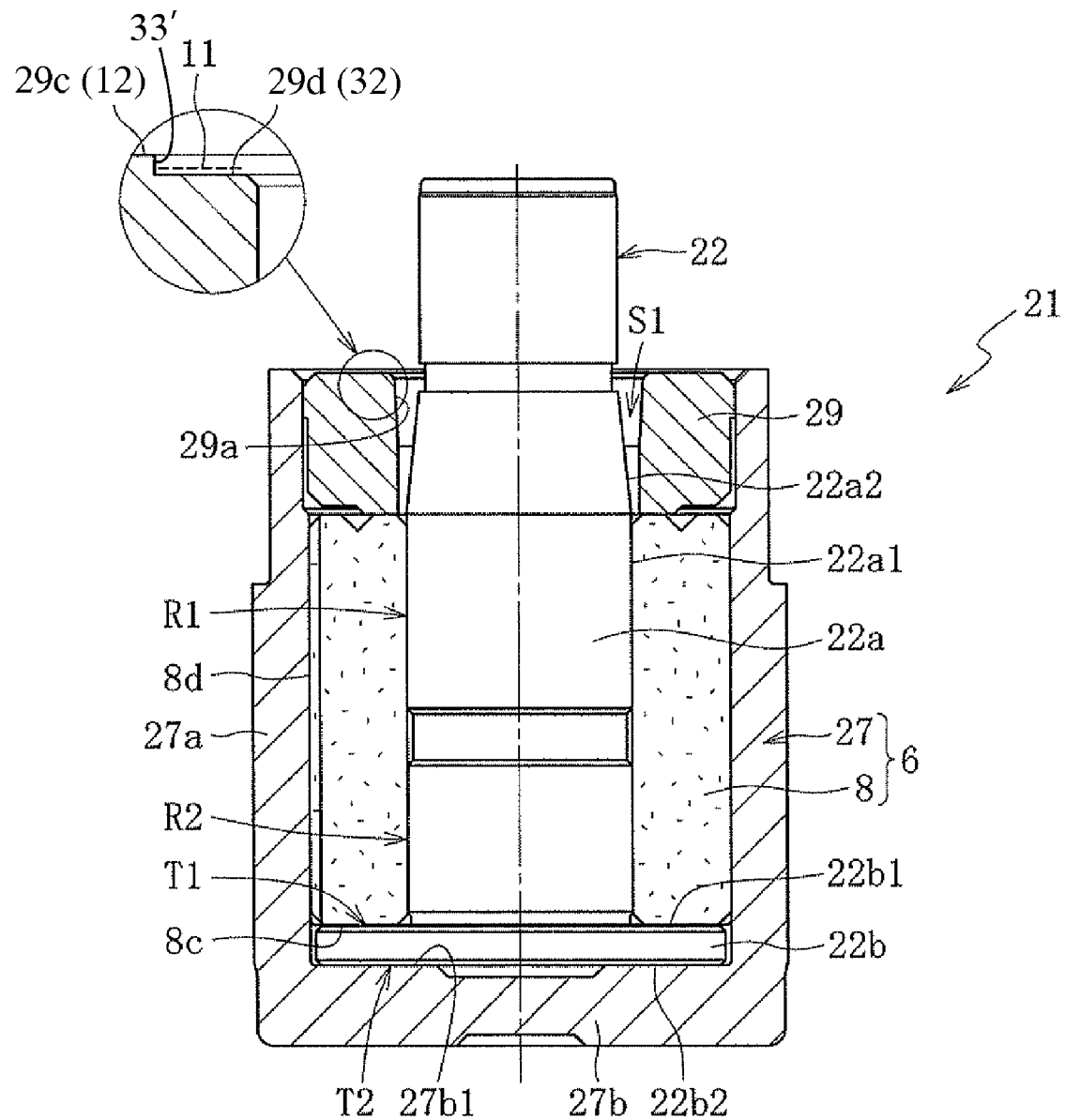
FIG. 7 is a sectional view of a fluid dynamic bearing device according to a third embodiment of the present invention.

FIG. 7 illustrates a fluid dynamic bearing device according to a third embodiment of the present invention. A fluid dynamic bearing device 31 illustrated in the figure is structurally different from that according to the second embodiment illustrated in FIG. 6 in that, in the housing 27 of the fluid dynamic bearing device 21 illustrated in FIG. 6, a step portion 27c provided integrally with the inner periphery of the boundary portion between the side portion 27a and the bottom portion 27b is omitted, and that the flange portion 22b of the shaft member 22 is enlarged in a radial direction. Note that, other components are the same as those in the second embodiment illustrated in FIG. 6, and hence are denoted by the same reference symbols so as to omit description thereof.

In each of the fluid dynamic bearing devices, the oil-repellent film 11 is provided on the end surface, which is provided while being retracted to the inner side of the bearing device with respect to the respective pressure-receiving surfaces 12. However, conversely, the respective pressure-receiving surfaces 12 may be provided while being retracted to the inner side of the bearing device with respect to the respective oil-repellent films 11.

Further, hereinbefore, there are described cases where the flange portion or the seal member serving as a seal portion is provided separately from the shaft member 2 or the housing 7. However, for example, in the fluid dynamic bearing device 1 according to the embodiment illustrated in FIG. 2, it is possible to form any one of the first flange portion 9 and the second flange portion 10 integrally with the shaft member 2. Further, in the fluid dynamic bearing devices 21 and 31 respectively illustrated in FIGS. 6 and 7, it is possible to form the bottom portion 27, which constitutes the housing 27, as a separate member, thereby possible to provide the seal member 29 serving as the seal portion integrally with the housing 7 (all of which are not shown).

Further, regarding each of the fluid dynamic bearing devices described above, there are described cases where the bearing member 6 is constituted by the housing 7 (27) and the bearing sleeve 8 fixed to the inside of the housing 7. However, the bearing member 6 may be constituted by the housing 7 and the bearing sleeve 8 integrated with each other. Note that, in the case of adopting such structures to the fluid dynamic bearing devices 21 and 31 according to the respective embodiments illustrated in FIGS. 6 and 7, similarly to the above, it is sufficient that the bottom portion 27b constituting the housing 27 is formed as a separate member. Further, in the case of forming the bottom portion 27b as a separate member, the housing 7, the bearing sleeve 8, the seal member 29 may be integrated with each other so as to constitute the bearing member 6 (all of which are not shown).

Further, while in the above description the radial bearing portions R1 and R2 and the thrust bearing portions T1 and T2 generate the dynamic pressure effect of the lubricant oil by the dynamic pressure grooves of a herringbone or a spiral pattern, it is also possible to adopt, as the radial bearing portions R1 and R2, so-called step bearings, multi-arc bearings, or non-complete round bearings, and to adopt, as the thrust bearing portions T1 and T2, so-called step bearings or corrugated bearings. Further, when the radial bearing portion is constituted by the step bearing or the multi-arc bearing, two radial bearing portions may be provided separately in an axial direction from each other like the radial bearing portions R1 and R2. Alternatively, one radial bearing portion may be formed over the upper and lower regions of the inner peripheral side of the bearing sleeve 8. In addition, it is also possible to adopt, as the radial bearing portions R1 and R2, so-called complete round bearings which do not include the dynamic pressure generating portions, and to adopt, as the thrust bearing portions, pivot bearings with which the end portion of the shaft member is supported in a contact manner.

The invention claimed is:
1. A fluid dynamic bearing device, comprising:
a bearing sleeve having a radial bearing surface;
a shaft member inserted in an inner periphery of the bearing sleeve;
a housing having the bearing sleeve fixed to its inner periphery;
a radial bearing gap formed between the radial bearing surface of the bearing sleeve and an outer peripheral surface of the shaft member;
a radial bearing portion for supporting in a radial direction the shaft member to be supported with an oil film formed in the radial bearing gap;
a seal space opened to external air; and
a seal portion forming the seal space, wherein the seal portion is formed of a non-porous metal material or resin material, formed separately from the bearing sleeve, and has an end surface exposed to the external air, a step portion in an axial direction is formed at the end surface of the seal portion, the end surface is defined into a first end surface and a second end surface by the step portion, the second end surface is arranged closer to an inside bearing side than the first end surface, and an oil-repellent film is formed on the second end surface, and the first end surface is a pressure-receiving surface subjected to pressure at a time of assembly.

2. A fluid dynamic bearing device according to claim 1, wherein the seal portion is formed on the housing and on a flange portion formed on the shaft member, and the seal space is formed between an inner peripheral surface of the housing and an outer peripheral surface of the flange portion.

3. A fluid dynamic bearing device according to claim 1, wherein the seal portion is formed on a seal member fixed to an inner periphery of the housing, and the seal space is formed by an inner peripheral surface of the seal member.

4. A fluid dynamic bearing device according to claim 1, wherein the bearing sleeve and the housing are formed integrally.

* * * * *